Patented May 10, 1927.

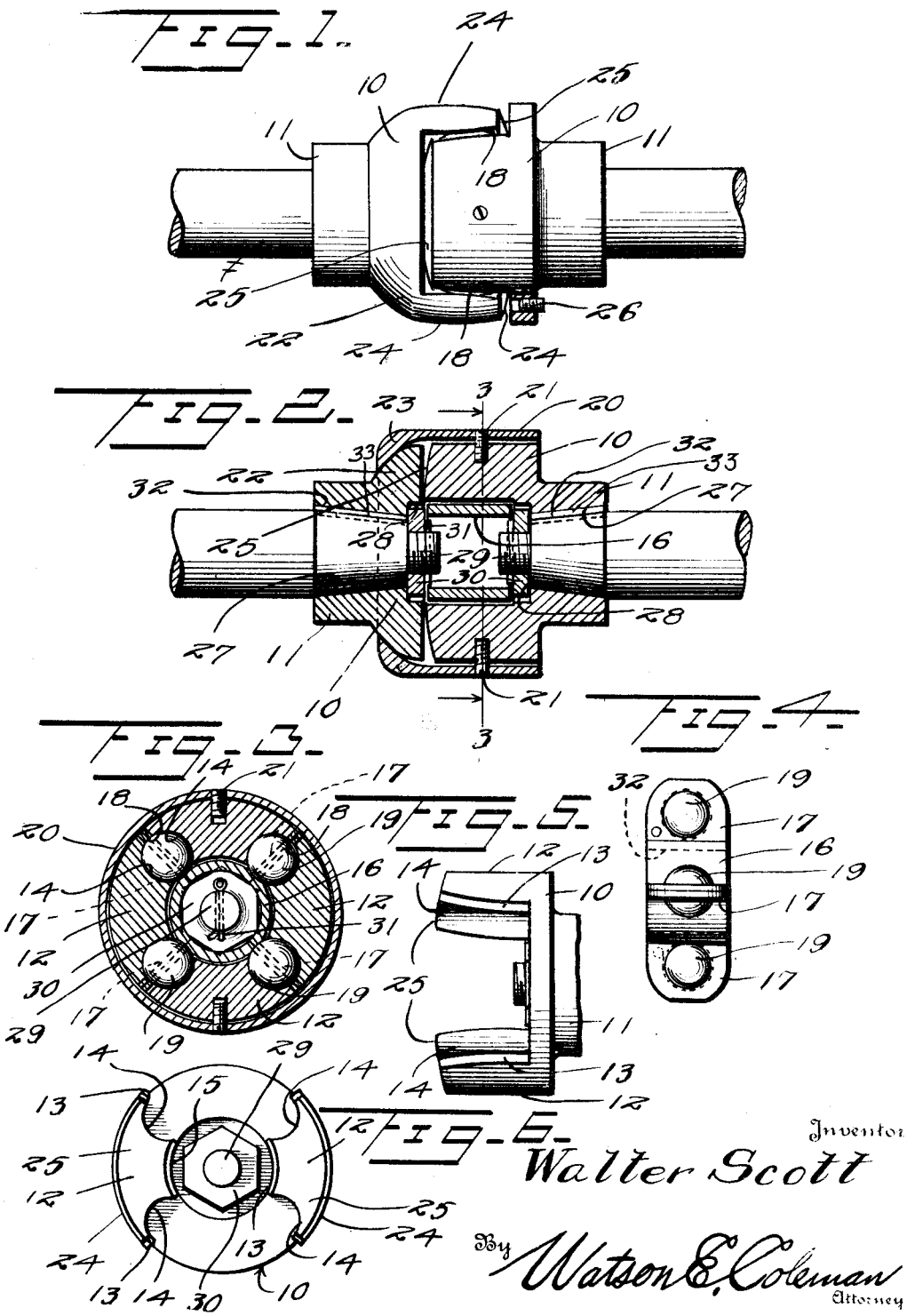

1,627,932

UNITED STATES PATENT OFFICE.

WALTER SCOTT, OF SHERIDAN, WYOMING.

BALL-BEARING UNIVERSAL JOINT.

Application filed December 28, 1926. Serial No. 157,587.

This invention relates to ball bearing universal joints and has for an important object thereof the provision of a device of this character which may be very readily assembled and which will be durable and efficient in service.

A further object of the invention is to produce a device of this character in which the ball bearings may be supported from a cage so that they are at all times properly positioned and may be conveniently held while assembling the joint.

A further object of the invention is to produce a device of this character which may be readily attached to or detached from the shaft.

These and other objects I attain by the construction shown in the accompanying drawings, wherein for the purpose of illustration is shown a preferred embodiment of my invention and wherein—

Figure 1 is a side elevation of a ball bearing universal joint constructed in accordance with my invention, the connecting casing being removed;

Figure 2 is a longitudinal sectional view therethrough;

Figure 3 is a section on the line 3—3 of Figure 2;

Figure 4 is a side elevation of the ball race removed;

Figure 5 is a side elevation of one of the sections;

Figure 6 is an end elevation of one of the sections.

Referring now more particularly to the drawings, the bearing is formed in two main sections, which include a head 10 having a hub 11 and a plurality of circumferentially spaced longitudinally extending lugs 12 projecting from the opposite face of the head from the hub. The side walls 13 of each of the lugs 12 have formed therein a substantially semicircular longitudinally extending groove 14 and the side walls themselves at the sides of the groove are slightly arcuately curved, as will be more apparent from an inspection of Figure 5. These lugs have their inner walls 15 spaced outwardly from and are curved upon a radius having at its center the axis of the head, with the result that when the main sections of the coupling are placed in assembled relation, so that the lugs 12 interdigitate between adjacent faces of the lugs, longitudinally extending circular chambers are formed and at the center of the assemblage an axially disposed central chamber is produced.

Within this chamber I arrange a sleeve 16 of such size that it fits the chamber and this sleeve is provided with a radially directed flange 17 for each slot 18 between adjacent faces of the interdigitated lugs. Each flange 17 has formed therein an aperture receiving a thrust ball 19. The construction of the sleeve 16 and its flange is preferably such that the balls are retained in position in these apertures at all times whether the sleeve is removed from the coupling or not.

As a means for maintaining the main sections of the coupling in assembled relation, a coupling sleeve 20 is employed, this sleeve surrounding the sections and being rigidly connected to one thereof by screws 21 or the like. The junction of the head and hub of the other section is in the form of a rounded shoulder 22 and the end of the sleeve embracing this section has an inturned internally curved flange 23 engaging over this rounded shoulder. The lugs of this last named section have their outer faces 24 slightly longitudinally curved, as more particularly illustrated in Figure 1, and the upper faces 25 of the lugs of the section to which the sleeve is attached incline upwardly from their outer edges toward their inner edges, so that the requisite rocking movement of the unattached section may take place, while the unattached section is provided with an actual bearing engagement with the attached section. If desired, an opening 26 may be formed through one of the heads, for the passage of lubricant to the coupling. The preferred method of coupling the sections to the shaft consists in forming in the hub 11 and head 10 of the sections a tapered bore 27 and in providing the lug bearing face of the head with a shallow recess 28. The shaft has its end tapered for insertion in the tapered bore and is provided with a reduced threaded extremity 29. This threaded extremity is engaged by a nut 30 located within the recess and this nut may be secured by a cotter pin 31. The projecting ends of the shaft may extend into the bore 32 of the sleeve 16. If desired, a key 33 is further employed to prevent relative rotation of the sections and their attached shafts.

Since the construction hereinbefore set forth is capable of a certain range of change and modification without materially departing from the spirit of the invention, I do not limit myself to such specific structure except as hereinafter claimed.

I claim:

1. A ball bearing universal joint comprising heads adapted for attachment to shaft sections having lugs upon adjacent faces, said lugs interdigitating and having the adjacent faces thereof provided with coacting grooves combining to produce longitudinally directed ball receiving channels, said lugs and heads combining in the assembled relation thereof to produce a central axial chamber, a sleeve within said chamber and having projecting ball retaining elements corresponding in number to the spaces between adjacent faces of the lugs and balls carried by said flanges and operating in the channels and means for connecting the sections to one another permitting relative angular displacement thereof.

2. A ball bearing universal joint comprising heads adapted for attachment to shaft sections having lugs upon adjacent faces, said lugs interdigitating and having the adjacent faces thereof provided with coacting grooves combining to produce longitudinally directed ball receiving channels, said lugs and heads combining in the assembled relation thereof to produce a central axial chamber, a sleeve within said chamber and having projecting ball retaining elements corresponding in number to the spaces between adjacent faces of the lugs and balls carried by said flanges and operating in the channels and means for connecting the sections to one another permitting relative angular displacement thereof, opposed faces of the lugs being slightly arcuately curved longitudinally.

3. A ball bearing universal joint comprising heads adapted for attachment to shaft sections having lugs upon adjacent faces, said lugs interdigitating and having the adjacent faces thereof provided with coacting grooves combining to produce longitudinally directed ball receiving channels, said lugs and heads combining in the assembled relation thereof to produce a central axial chamber, a sleeve within said chamber and having projecting ball retaining elements corresponding in number to the spaces between adjacent faces of the lugs, balls carried by said flanges and operating in the channels and means for connecting the sections to one another permitting relative angular displacement thereof, opposed faces of the lugs being slightly arcuately curved longitudinally, the outer faces of the lugs of one of the sections being slightly arcuately curved longitudinally.

4. A ball bearing universal joint comprising heads adapted for attachment to shaft sections having lugs upon adjacent faces, said lugs interdigitating and having the adjacent faces thereof provided with coacting grooves combining to produce longitudinally directed ball receiving channels, said lugs and heads combining in the assembled relation thereof to produce a central axial chamber, a sleeve within said chamber and having projecting ball retaining elements corresponding in number to the spaces between adjacent faces of the lugs, balls carried by said flanges and operating in the channels and means for connecting the sections to one another permitting relative angular displacement thereof, opposed faces of the lugs being slightly arcuately curved longitudinally, the outer faces of the lugs of one of the sections being slightly arcuately curved longitudinally, the end faces of the lug of one of the sections being slightly crowned toward the center of the sections.

In testimony whereof I hereunto affix my signature.

WALTER SCOTT.